(12) United States Patent
Underdal et al.

(10) Patent No.: US 7,765,040 B2
(45) Date of Patent: Jul. 27, 2010

(54) REVERSE FAILURE ANALYSIS METHOD AND APPARATUS FOR DIAGNOSTIC TESTING

(75) Inventors: Olav M. Underdal, Kalamazoo, MI (US); Harry M. Gilbert, Portage, MI (US); Oleksiy Portyanko, Portage, MI (US); Randy L. Mayes, Otsego, MI (US); Gregory J. Fountain, Kalamazoo, MI (US); William W. Wittliff, III, Gobles, MI (US)

(73) Assignee: SPX Corporation, Charlotte, NC (US)

( * ) Notice: Subject to any disclaimer, the term of this patent is extended or adjusted under 35 U.S.C. 154(b) by 639 days.

(21) Appl. No.: 11/452,273

(22) Filed: Jun. 14, 2006

(65) Prior Publication Data

US 2007/0294003 A1    Dec. 20, 2007

(51) Int. Cl.
*G01M 17/00*    (2006.01)

(52) U.S. Cl. .................. 701/29; 701/33; 702/185; 340/438

(58) Field of Classification Search .................. 701/29, 701/35, 33; 717/168; 702/183, 185; 340/438; G01M 17/00; G06F 19/00
See application file for complete search history.

(56) References Cited

U.S. PATENT DOCUMENTS

| | | | |
|---|---|---|---|
| 4,866,635 A | | 9/1989 | Kahn et al. |
| 5,631,831 A | | 5/1997 | Bird et al. |
| 6,141,608 A | * | 10/2000 | Rother ......................... 701/33 |
| 6,192,302 B1 | * | 2/2001 | Giles et al. .................... 701/29 |
| 6,282,469 B1 | * | 8/2001 | Rogers et al. .................. 701/29 |
| 6,714,846 B2 | * | 3/2004 | Trsar et al. ..................... 701/33 |
| 6,845,307 B2 | * | 1/2005 | Rother ......................... 701/33 |
| 6,868,319 B2 | * | 3/2005 | Kipersztok et al. ............. 701/29 |
| 7,209,860 B2 | * | 4/2007 | Trsar et al. .................. 702/183 |
| 2003/0005246 A1 | * | 1/2003 | Peinado ...................... 711/163 |
| 2003/0167111 A1 | * | 9/2003 | Kipersztok et al. ............ 701/29 |
| 2004/0103121 A1 | | 5/2004 | Johnson et al. |
| 2005/0177286 A1 | * | 8/2005 | Namaky et al. ............... 701/33 |
| 2005/0222718 A1 | * | 10/2005 | Lazarz et al. .................. 701/1 |
| 2006/0149434 A1 | * | 7/2006 | Bertosa et al. ................ 701/29 |
| 2006/0161390 A1 | * | 7/2006 | Namaky et al. ............. 702/183 |
| 2007/0233341 A1 | * | 10/2007 | Logsdon ...................... 701/29 |

OTHER PUBLICATIONS

U.S. Appl. No. 11/052,118, filed Feb. 8, 2005, Fountain, et al.

* cited by examiner

*Primary Examiner*—Tuan C To
(74) *Attorney, Agent, or Firm*—Baker & Hostetler LLP

(57) ABSTRACT

A reverse failure analyzer determines a group of diagnostic test procedures related to a particular vehicle component from a pool of diagnostic procedures, and then identifies the specific failure modes of each of the diagnostic test procedures. The reverse failure analyzer further associates the specific failure modes with the respective vehicle component associated with each of the diagnostic test procedures, and the symptoms associated with each of the diagnostic test procedures to the correlated vehicle components and failure modes. In addition, the reverse failure analyzer can cross-reference various vehicle components that can be the root cause of a particular symptom or a vehicle operational problem. Furthermore, the reverse failure analyzer can receive observed symptoms regarding a particular test subject vehicle and correlate the observed symptoms to the vehicle components that can cause the symptoms based on the results of reverse failure analyses.

11 Claims, 3 Drawing Sheets

REVERSE FAILURE ANALYSIS METHOD AND APPARATUS FOR DIAGNOSTIC TESTING

FIELD OF THE INVENTION

The present invention relates generally to diagnostic equipment. More particularly, the present invention relates to reverse failure analysis of a diagnostic test procedure to identify symptoms that correlate to a failure mode of, for example, a vehicle component.

BACKGROUND OF THE INVENTION

Diagnostic systems are used by technicians and professionals in virtually all industries to perform basic and advanced system testing functions. For example, in the automotive, trucking, heavy equipment and aircraft industries, diagnostic test systems provide for vehicle onboard computer fault or trouble code display, interactive diagnostics, multiscope and multimeter functions, and electronic service manuals. In the medical industry, diagnostic systems provide for monitoring body functions and diagnosis of medical conditions, as well as system diagnostics to detect anomalies in the medical equipment.

In many industries, diagnostic systems play an increasingly important role in manufacturing processes, as well as in maintenance and repair throughout the lifetime of the equipment or product. Some diagnostic systems are based on personal computer technology and feature user-friendly, menu-driven diagnostic applications. These systems assist technicians and professionals at all levels in performing system diagnostics on a real-time basis.

A typical diagnostic system includes a display on which instructions for diagnostic procedures are displayed. The system also includes a system interface that allows the operator to view real-time operational feedback and diagnostic information. Thus, the operator may view, for example, vehicle engine speed in revolutions per minute, or battery voltage during start cranking; or a patient's heartbeat rate or blood pressure. With such a system, a relatively inexperienced operator may perform advanced diagnostic procedures and diagnose complex operational or medical problems.

The diagnostic procedures for diagnostic systems of this sort are typically developed by experienced technical experts or professionals. The technical expert or professional provides the technical experience and knowledge required to develop complex diagnostic procedures. However, the diagnostic procedures generally are oriented toward beginning with a symptom and identifying the cause, or failure mode, of the symptom.

Thus, existing diagnostic systems have a disadvantage in that the diagnostic test procedures focus on beginning from a symptom and diagnosing a failure mode that is the cause of the symptom. As a result, the diagnostic test procedures of existing diagnostic systems generally do not correlate all of the possible symptoms of a particular failure mode, or of a particular vehicle component, with the corresponding failure mode or component. Accordingly, it is desirable to provide a method and apparatus for reverse failure analysis of diagnostic test procedures to identify all of the known or possible symptoms that can be associated with a failure mode or with a vehicle component, and for correlating the symptoms with the corresponding failure mode or component.

SUMMARY OF THE INVENTION

The foregoing needs are met, to a great extent, by the present invention, wherein in one aspect an apparatus and method are provided that in some embodiments perform a reverse failure analysis of a diagnostic test procedure or diagnostic test sequence to identify all of the known or possible symptoms that can be associated with a failure mode or a vehicle component, and correlate these symptoms with the corresponding failure mode or component.

In accordance with one embodiment of the present invention, a computer-implemented method of reverse failure analysis can include selecting a first diagnostic test related to a first component of a vehicle from a pool of diagnostic tests. The method can further include associating a first symptom with the first component based on the first diagnostic test.

In accordance with another embodiment of the present invention, a computer program product for performing a reverse failure analysis, including a computer-readable medium encoded with instructions configured to be executed by a processor in order to perform predetermined operations, which can include selecting a first diagnostic test related to a first component of a vehicle from a pool of diagnostic tests. The predetermined instructions can further include associating a first symptom with the first component based on the first diagnostic test.

In accordance with yet another embodiment of the present invention, a diagnostic tool for performing a reverse failure analysis can include means for selecting a first diagnostic test related to a first component of a vehicle from a pool of diagnostic tests. The diagnostic tool can further include first association means for associating a first symptom with the first component based on the first diagnostic test.

In accordance with still another embodiment of the present invention, a diagnostic tool for performing a reverse failure analysis can include a diagnostic test selection module configured to select a first diagnostic test related to a first component of a vehicle from a pool of diagnostic tests. The diagnostic tool can further include a first association module configured to associate a first symptom with the first component based on the first diagnostic test.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the

DETAILED DESCRIPTION

Figure 1:
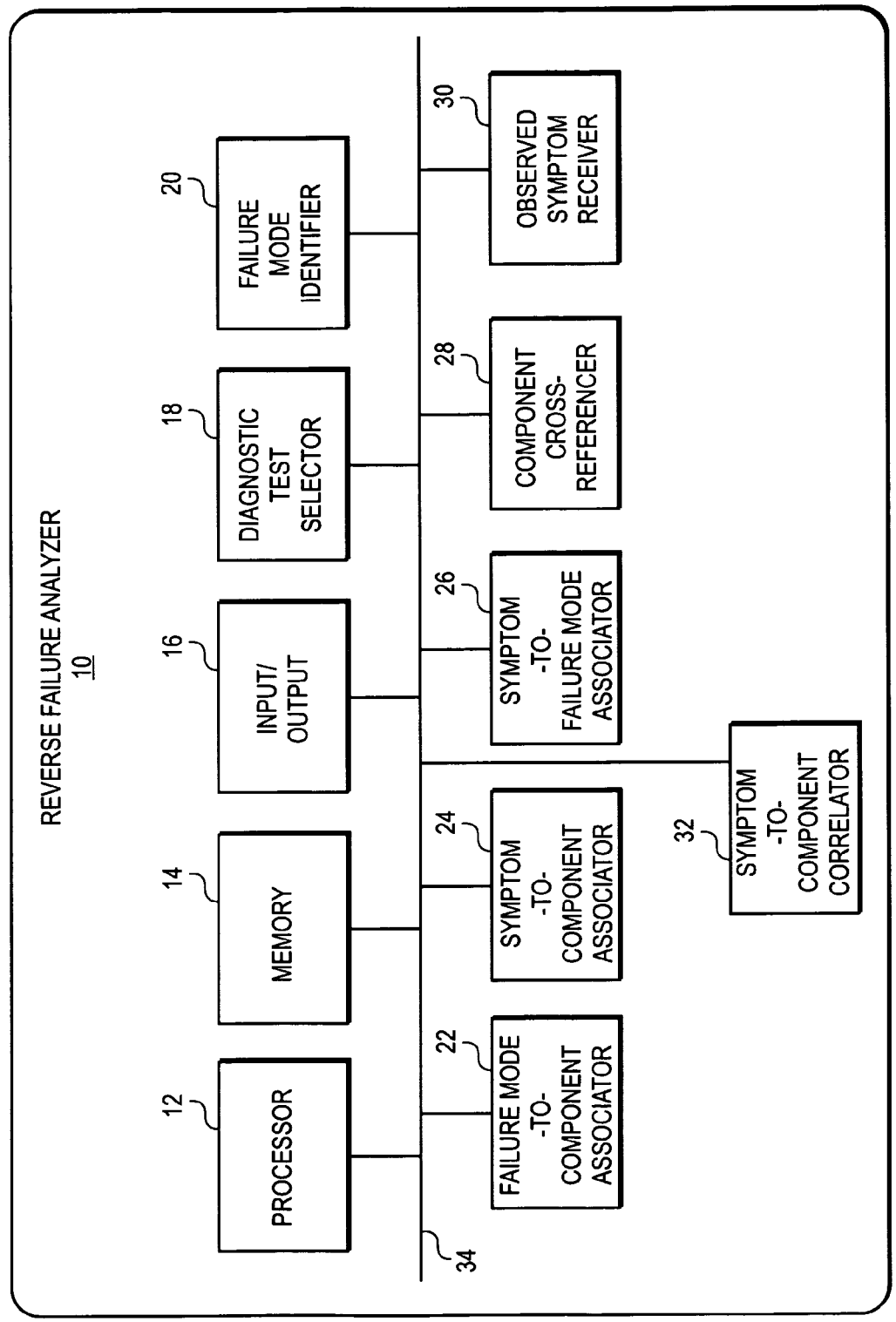
FIG. 1 is a schematic block diagram illustrating a reverse failure analyzer according to an embodiment of the invention.

An embodiment of the present inventive method and apparatus can provide a reverse failure analyzer that can identify symptoms, or operational problems, of a vehicle and correlate each symptom to a specific failure mode or vehicle component that is the cause of the symptom. The reverse failure analyzer can include a diagnostic test selector that can select diagnostic test procedures that are associated with a specific failure mode or vehicle component. The reverse failure analyzer also can include a failure mode identifier that can identify a specific failure mode of a vehicle component associated with a diagnostic test procedure.

In addition, the reverse failure analyzer can include a failure mode-to-component associator that can associate the specific failure mode associated with the diagnostic test procedure with the corresponding component, a symptom-to-component associator that can identify the symptom associated with the diagnostic test procedure with the corresponding component, and a symptom-to-failure mode associator that can associate the symptom of the diagnostic test procedure to the corresponding failure mode. Thus, by analyzing a sequence of diagnostic test procedures, the reverse failure analyzer can compile a complete list of known or possible symptoms with each failure mode of each vehicle component.

The reverse failure analyzer can further include a component cross-referencer that can identify various vehicle components that can present with a particular symptom. In addition, the reverse failure analyzer can include an observed symptom receiver that can receive information regarding a symptom that has been observed on a specific test subject vehicle, and a symptom-to-component correlator that can correlate the symptom observed on the specific vehicle to a particular vehicle component or to a group of vehicle components that can cause the observed symptom.

The reverse failure analyzer can be used to identify all of the known or possible failure modes of a particular vehicle component, and all of the symptoms that can be caused by the failure mode or by that particular vehicle component. This information can be useful to expert vehicle technicians in diagnosing vehicle symptoms or operational problems, as well as during training of vehicle technicians regarding vehicle diagnostics. The results of the reverse failure analysis of a complete set of diagnostic test procedures associated with particular vehicle model can further be used to cross-reference multiple symptoms that can be caused by a single failure mode, or symptoms that can be caused by multiple, simultaneous failure modes. In addition, the results of the reverse failure analysis can be used to identify all of the vehicle components that may be the cause of a symptom or a group of symptoms observed on a vehicle, for example, in order to determine which vehicle components should be stocked in a vehicle service center or on a mobile service unit.

An embodiment of the reverse failure analyzer can complement or can be an integral part of a diagnostic test procedure generator. An example of a diagnostic test procedure generator that is compatible with the interactive diagnostic schematic generator is disclosed in copending U.S. patent application, entitled "Diagnostic Decision Sequencing Method and Apparatus for Optimizing a Diagnostic Test Plan," filed concurrently herewith by Fountain, et al., the disclosure of which is hereby incorporated by reference in its entirety.

The invention will now be described with reference to the drawing figures, in which like reference numerals refer to like parts throughout. An embodiment of the present inventive apparatus and method is illustrated in FIG. 1, which illustrates a reverse failure analyzer 10. The reverse failure analyzer 10 can identify a symptom associated with a diagnostic test procedure and associate the symptom with the specific failure mode associated with the diagnostic test procedure, as well as with the corresponding vehicle component. By analyzing a complete set of diagnostic test procedures or a diagnostic test sequence, the reverse failure analyzer 10 can compile a complete list of all known or possible symptoms or vehicle operational problems that can be associated with a particular vehicle component.

An example of a diagnostic method for use with a vehicle diagnostic system of this type is disclosed in U.S. Pat. No. 5,631,831, entitled "Diagnosis Method For Vehicle Systems," to Bird, et al., dated May 20, 1997, the disclosure of which is hereby incorporated by reference in its entirety. A diagnostic test sequence can navigate a vehicle technician through a step-by-step test sequence based on a vehicle onboard computer trouble code or on a vehicle operational symptom. For example, during vehicle diagnostics, test step instructions and related information can be displayed to the vehicle technician on a display screen panel.

Diagnostic procedures can be authored, for example, by an expert vehicle technician, and subsequently ordered in an optimal sequence. An example of a method for authoring diagnostic procedures for use with a vehicle diagnostic system is disclosed in U.S. patent application Ser. No. 11/052,118, filed by Fountain, et al. on Feb. 8, 2005, the disclosure of which is hereby incorporated by reference in its entirety.

The reverse failure analyzer 10 can include a processor 12, a memory 14, an input/output device 16, a diagnostic test selector 18, a failure mode identifier 20, a failure mode-to-component associator 22, a symptom-to-component associator 24, a symptom-to-failure mode associator 26, a component cross-referencer 28, an observed symptom receiver 30, and a symptom-to-component correlator 32, all of which can be interconnected by a data link 34. The processor 12, the memory 14 and the input/output device 16 can be part of a general computer, such as a personal computer (PC), a UNIX workstation, a server, a mainframe computer, a personal digital assistant (PDA), or some combination of these. Alternatively, the processor 12, the memory 14 and the input/output device 16 can be part of a specialized computing device, such as a vehicle diagnostics scan tool. The remaining components can include programming code, such as source code, object code or executable code, stored on a computer-readable medium that can be loaded into the memory 14 and processed by the processor 12 in order to perform the desired functions of the reverse failure analyzer 10.

In various embodiments, the reverse failure analyzer 10 can be coupled to a communication network, which can include any viable combination of devices and systems capable of linking computer-based systems, such as the Internet; an intranet or extranet; a local area network (LAN); a wide area network (WAN); a direct cable connection; a private network; a public network; an Ethernet-based system; a token ring; a value-added network; a telephony-based system, including, for example, T1 or E1 devices; an Asynchronous Transfer Mode (ATM) network; a wired system; a wireless system; an optical system; a combination of any number of distributed processing networks or systems or the like.

An embodiment of the reverse failure analyzer 10 can be coupled to the communication network by way of the local data link, which in various embodiments can incorporate any combination of devices—as well as any associated software or firmware—configured to couple processor-based systems, such as modems, network interface cards, serial buses, parallel buses, LAN or WAN interfaces, wireless or optical interfaces and the like, along with any associated transmission protocols, as may be desired or required by the design.

Additionally, an embodiment of the reverse failure analyzer 10 can communicate information to the user and request user input by way of an interactive, menu-driven, visual display-based user interface, or graphical user interface (GUI). The user interface can be executed, for example, on a personal computer (PC) with a mouse and keyboard, with which the user may interactively input information using direct manipulation of the GUI. Direct manipulation can include the use of a pointing device, such as a mouse or a stylus, to select from a variety of selectable fields, including selectable menus, drop-down menus, tabs, buttons, bullets, checkboxes, text boxes, and the like. Nevertheless, various embodiments of the invention may incorporate any number of additional functional user interface schemes in place of this interface scheme, with or without the use of a mouse or buttons or keys, including for example, a trackball, a touch screen or a voice-activated system.

The diagnostic test selector 18 can determine a group of diagnostic test procedures that are related to a particular vehicle component on which to perform a reverse failure analysis. As an example, the diagnostic test selector 18 may determine that an engine cylinder compression test procedure and an engine cooling system test procedure are related to an engine cylinder head gasket.

The failure mode identifier 20 can identify the specific failure mode associated with each of the diagnostic test procedures, and the failure mode-to-component associator 22 can associate each of the failure modes to the specific component of the vehicle. As an example, the failure mode identifier 20 may identify a tear in the cylinder head gasket between an engine cylinder and an engine coolant passageway as being associated with the engine cooling system test, and the failure mode-to-component associator may associate the tear between an engine cylinder and an engine coolant passageway with the cylinder head gasket. For example, the failure mode-to-component associator 22 can compile a list of failure modes associated with a vehicle component, or create a database, for example, a relational database, that associates each of the specific failure modes with the vehicle component.

The symptom-to-component associator 24 can associate each of the symptoms related to the individual diagnostic test procedures with the respective component associated with the diagnostic test procedure. As an example, the symptom-to-component associator 24 may associate engine overheating—a symptom related to the engine cooling system test procedure—with the engine cylinder head gasket. For example, the symptom-to-component associator 24 can compile a complete list of symptoms that can be caused by failure modes of the vehicle component, or create a database, for example, a relational database, that associates each of the symptoms that can be caused by the vehicle component to that component.

Similarly, the symptom-to-failure mode associator 26 can associate each of the symptoms that can be caused by a specific failure mode identified by the failure mode identifier 20 with the specific failure mode. As an example, the symptom-to-failure mode associator 26 may associate engine overheating with a tear in the cylinder head gasket. For example, the symptom-to-failure mode associator 26 can compile a complete list of symptoms associated with a specific failure mode, or create a database, for example, a relational database, that associates each of the symptoms with the specific failure mode.

The component cross-referencer 28 can use the results of a series of reverse failure analyses performed by the reverse failure analyzer 10 to identify various vehicle components that can be the root cause of a symptom or vehicle operational problem, and cross-reference the various components to each other. As an example, the component cross-referencer 28 may identify the cylinder head gasket and an engine coolant pump as components that can cause overheating, based on reverse failure analyses of the engine cooling system test procedure and an engine coolant pump test procedure. For example, the component cross-referencer 28 can compile a complete list of vehicle components that can be the root cause of a particular symptom, or create a database, for example, a relational database, that associates each of the components with each other.

In addition, the observed symptom receiver 30 can receive a symptom or a group of symptoms that have been observed on a specific test subject vehicle. For example, the observed symptom receiver 30 can receive a user input or an identifier over a communication network indicating the symptom or symptoms observed on the test subject vehicle. The symptom-to-component correlator 32 can then use the results of reverse failure analyses of a set of diagnostic test procedures to correlate the observed symptom or symptoms to a vehicle component that can be the root cause of the observed symptom or symptoms.

As an example, the observed symptom receiver 30 may receive a manual data entry or a wireless electronic message communicating that a customer vehicle has experienced an engine overheat condition. The symptom-to-component correlator 32 may then correlate the engine overheat condition to the cylinder head gasket or to the engine coolant pump based on results of reverse failure analysis of the engine cooling system test procedure and the engine coolant pump test procedure.

Thus, for example, the symptom-to-component correlator 32 can be used to plan inventory, for example, in a service center or on a mobile service unit. As an example, a list of components identified by the symptom-to-component correlator 32 over a period of time, such as a week or a month, may be manually or automatically ordered to restock a service center. In addition, for example, the symptom-to-component correlator 32 can be used in a decision-making process to determine which of multiple mobile service units would be best-equipped to respond to a reported vehicle problem based on the observed symptom or symptoms on the test subject vehicle. As an example, a mobile service unit with both a cylinder head gasket and an engine coolant pump onboard could be sent in response to the customer vehicle overheat condition described above.

Figure 2:
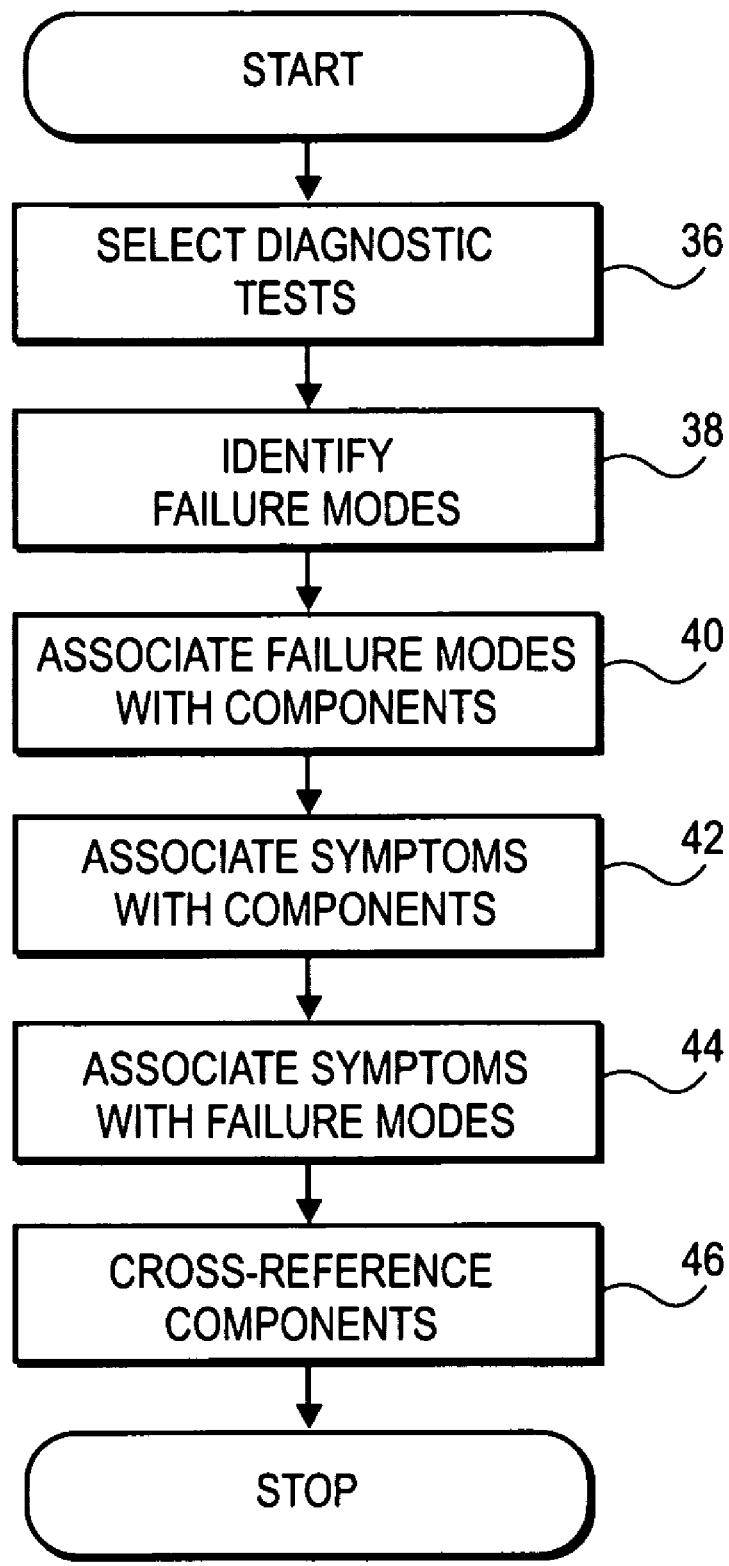
FIG. 2 is a flowchart illustrating steps that may be followed in accordance with one embodiment of the method or process of reverse failure analysis.

FIG. 2 is a flowchart illustrating a sequence of steps that can be performed in order to perform a reverse failure analysis of a diagnostic test procedure. The process can begin by proceeding to step 36, "Select Diagnostic Tests," in which a diagnostic test procedure or a set of diagnostic test procedures can be determined that are related to a particular vehicle component, as described above. Then, in step 38, "Identify Failure Modes," the specific failure modes related to each of the selected diagnostic test procedures determined in step 36 above can be identified, and in step 40, "Associate Failure Modes With Components," the specific failure modes associated with each of the selected diagnostic test procedures can be associated with the specific vehicle components associated with the respective diagnostic test procedures, as explained above.

Similarly, in step 42, "Associate Symptoms With Components," all of the known or possible symptoms that the test procedures indicate can be caused by a particular vehicle component can be associated with that component. For example, a complete listing of the symptoms associated with a particular component can be compiled, or a database can be created associating the symptoms with the components, as explained above.

Correspondingly, in step 44, "Associate Symptoms With Failure Modes," all of the known or possible symptoms that can be caused by a particular failure mode can be associated with that failure mode. For example, a complete listing of all of the symptoms associated with a particular failure mode can be compiled, or a database can be created associating these symptoms with the failure modes, as further explained above. Subsequently, in step 46, "Cross-Reference Components," the various components can be the root cause of a particular symptom that can be cross-referenced, for example, by compiling a complete list or creating a database associating the various components with each other, as explained above.

Figure 3:
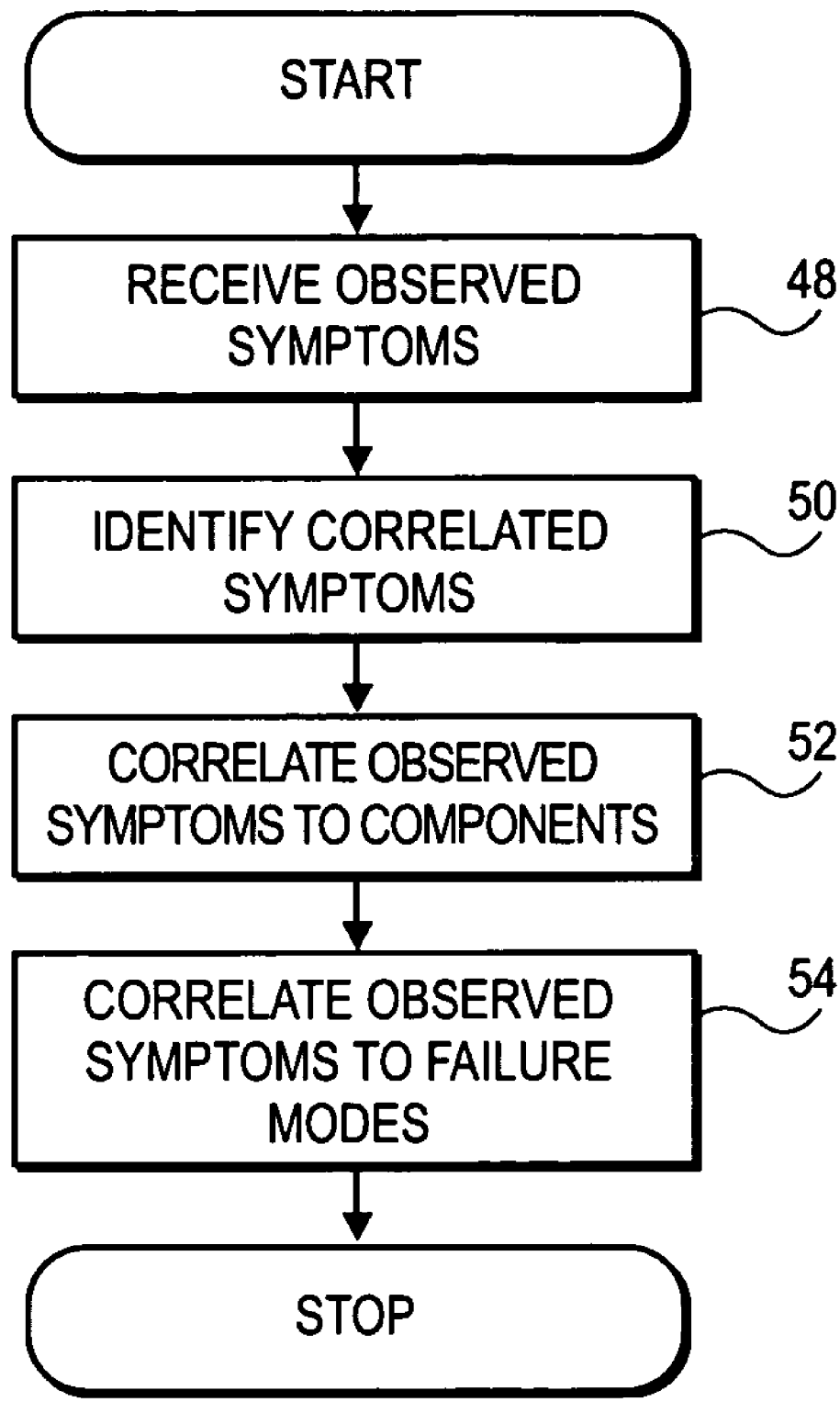
FIG. 3 is a flowchart illustrating steps that may be followed to correlate observed symptoms with a failure mode or a vehicle component using reverse failure analysis.

FIG. 3 is a flowchart illustrating a sequence of steps that can be performed in order to correlate observed symptoms of a specific test subject vehicle to the vehicle components or specific failure modes that can be the root cause of the observed symptoms, based on the results of a reverse failure analysis. The process can begin by proceeding to step 48, "Receive Observed Symptoms," wherein an observed symptom, or an observed vehicle operational problem, can be received. For example, the observed symptoms can be received by way of a user input or by way a data input, for example, over a communications network, as described above.

Then, in step 50, "Identify Correlated Symptoms," the results of reverse failure analyses performed on a set of diagnostic test procedures can be used to correlate the observed symptom or vehicle operational problem with the equivalent or corresponding symptoms in the diagnostic test procedures, as explained above. Next, in step 52, "Correlate Observed Symptoms To Components," the observed symptoms can be correlated to the vehicle component or components that can be the root cause of the correlated symptoms, as further described above. Additionally, in step 54, "Correlate Observed Symptoms To Failure Modes," the observed symptoms can be correlated to a failure mode or failure modes associated with the diagnostic test procedures related to the observed symptoms, as explained above.

FIGS. 1, 2 and 3 are block diagrams and flowcharts of methods, apparatuses and computer program products according to various embodiments of the present invention. It will be understood that each block or step of the block diagram, flowchart and control flow illustrations, and combinations of blocks in the block diagram, flowchart and control flow illustrations, can be implemented by computer program instructions or other means. Although computer program instructions are discussed, an apparatus according to the present invention can include other means, such as hardware or some combination of hardware and software, including one or more processors or controllers, for performing the disclosed functions.

In this regard, FIG. 1 depicts the apparatus of one embodiment including several of the key components of a general-purpose computer by which an embodiment of the present invention may be implemented. Those of ordinary skill in the art will appreciate that a computer can include many more components than those shown in FIG. 1. However, it is not necessary that all of these generally conventional components be shown in order to disclose an illustrative embodiment for practicing the invention. The general-purpose computer can include a processing unit 12 and a system memory 14, which may include random access memory (RAM) and read-only memory (ROM). The computer also may include nonvolatile storage memory, such as a hard disk drive, where additional data can be stored.

An embodiment of the present invention can also include one or more input or output devices 16, such as a mouse, keyboard, monitor, and the like. A display can be provided for viewing text and graphical data, as well as a user interface to allow a user to request specific operations. Furthermore, an embodiment of the present invention may be connected to one or more remote computers via a network interface. The connection may be over a local area network (LAN) wide area network (WAN), and can include all of the necessary circuitry for such a connection.

Typically, computer program instructions may be loaded onto the computer or other general purpose programmable machine to produce a specialized machine, such that the instructions that execute on the computer or other programmable machine create means for implementing the functions specified in the block diagrams, schematic diagrams or flowcharts. Such computer program instructions may also be stored in a computer-readable medium that when loaded into a computer or other programmable machine can direct the machine to function in a particular manner, such that the instructions stored in the computer-readable medium produce an article of manufacture including instruction means that implement the function specified in the block diagrams, schematic diagrams or flowcharts.

In addition, the computer program instructions may be loaded into a computer or other programmable machine to cause a series of operational steps to be performed by the computer or other programmable machine to produce a computer-implemented process, such that the instructions that execute on the computer or other programmable machine provide steps for implementing the functions specified in the block diagram, schematic diagram, flowchart block or step.

Accordingly, blocks or steps of the block diagram, flowchart or control flow illustrations support combinations of means for performing the specified functions, combinations of steps for performing the specified functions and program instruction means for performing the specified functions. It will also be understood that each block or step of the block diagrams, schematic diagrams or flowcharts, as well as combinations of blocks or steps, can be implemented by special purpose hardware-based computer systems, or combinations of special purpose hardware and computer instructions, that perform the specified functions or steps.

As an example, provided for purposes of illustration only, a data input software tool of a search engine application can be a representative means for receiving a query including one or more search terms. Similar software tools of applications, or implementations of embodiments of the present invention, can be means for performing the specified functions. For example, an embodiment of the present invention may include computer software for interfacing a processing element with a user-controlled input device, such as a mouse, keyboard, touch screen display, scanner, or the like. Similarly, an output of an embodiment of the present invention may include, for example, a combination of display software, video card hardware, and display hardware. A processing element may include, for example, a controller or microprocessor, such as a central processing unit (CPU), arithmetic logic unit (ALU), or control unit.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A computer-implemented method of reverse failure analysis, comprising:
    selecting a first diagnostic test related to a first component of a vehicle from a pool of diagnostic tests;
    associating a first symptom with the first component based on the first diagnostic test;
    selecting at least one related diagnostic test related to each of a plurality of components of the vehicle from the pool, the plurality of components including at least the first component and a second component;
    associating at least one of a plurality of symptoms with each of the components based on the related diagnostic tests, the plurality of symptoms including the first symptom, wherein the first symptom is associated with at least the first component and the second component; and
    cross-referencing the first component with at least the second component based on the first symptom being associated with at least the first component and the second component.

2. The computer-implemented method of claim 1, further comprising:
    selecting a plurality of related diagnostic tests related to the first component from the pool, the related diagnostic tests including the first diagnostic test; and
    associating a plurality of symptoms with the first component based on the related diagnostic tests, the plurality of symptoms including the first symptom.

3. The computer-implemented method of claim 2, further comprising:
    identifying a plurality of failure modes of the first component based on the related diagnostic tests; and
    associating the failure modes with the first component.

4. The computer-implemented method of claim 3, further comprising associating at least one of the symptoms with each of the failure modes based on the related diagnostic tests.

5. The computer-implemented method of claim 1, further comprising:
    receiving an observed symptom regarding a test subject vehicle; and
    correlating the observed symptom to the first component based on the observed symptom corresponding to the first symptom.

6. A computer-implemented method of reverse failure analysis, comprising:
    selecting a first diagnostic test related to a first component of a vehicle from a pool of diagnostic tests;
    associating a first symptom with the first component based on the first diagnostic test;
    selecting a second diagnostic test related to the first component from the pool;
    associating a second symptom with the first component based on the second diagnostic test;
    receiving a plurality of observed symptoms regarding a test subject vehicle; and
    correlating the observed symptoms to the first component based on the observed symptoms corresponding to at least the first symptom and the second symptom.

7. A diagnostic tool for performing a reverse failure analysis, comprising:
    means for selecting a first diagnostic test related to a first component of a vehicle from a pool of diagnostic tests;
    first association means for associating a first symptom with the first component based on the first diagnostic test; and
    means for cross-referencing the first component with at least a second component based on the first symptom being associated with at least the first component and the second component, wherein the selecting means is further configured to select at least one related diagnostic test related to each of a plurality of components of the vehicle from the pool, the plurality of components including at least the first component and the second component, and the first association means is further configured to associate at least one of a plurality of symptoms with each of the components based on the related diagnostic tests, the plurality of symptoms including the first symptom, wherein the first symptom is associated with at least the first component and the second component.

8. The diagnostic tool of claim 7, wherein the selecting means is further configured to select a plurality of related diagnostic tests related to the first component from the pool, the related diagnostic tests including the first diagnostic test, and the first association means is further configured to associate a plurality of symptoms with the first component based on the related diagnostic tests, the plurality of symptoms including the first symptom.

9. The diagnostic tool of claim 7, further comprising:
    means for receiving an observed symptom regarding a test subject vehicle; and
    means for correlating the observed symptom to the first component based on the observed symptom corresponding to the first symptom.

10. A diagnostic tool for performing a reverse failure analysis, further comprising:
    means for selecting a first diagnostic test related to a first component of a vehicle from a pool of diagnostic tests;
    first association means for associating first symptom with the first component based on the first diagnostic test;
    means for identifying a plurality of failure modes of the first component based on the related diagnostic tests;
    second association means for associating the failure modes with the first component; and
    third association means for associating at least one of the symptoms with each of the failure modes based on the related diagnostic tests, wherein the selecting means is further configured to select a plurality of related diagnostic tests related to the first component from the pool, the related diagnostic tests including the first diagnostic test, and the first association means is further configured to associate a plurality of symptoms with the first component based on the related diagnostic tests, the plurality of symptoms including the first symptom.

11. A diagnostic tool for performing a reverse failure analysis, comprising:
   means for selecting a first diagnostic test related to a first component of a vehicle from a pool of diagnostic tests;
   first association means for associating a first symptom with the first component based on the first diagnostic test;
   means for receiving a plurality of observed symptoms regarding a test subject vehicle; and
   means for correlating the observed symptoms to the first component based on the observed symptoms corresponding to at least the first symptom and a second symptom, wherein the selecting means is further configured to select a second diagnostic test related to the first component from the pool and the first association means is further configured to associate the second symptom with the first component based on the second diagnostic test.

* * * * *